(12) United States Patent
Michel et al.

(10) Patent No.: US 9,551,247 B2
(45) Date of Patent: Jan. 24, 2017

(54) GEAR OIL CHAMBER

(75) Inventors: Christian Michel, Ravensburg (DE); Michael Ebenhoch, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 148 days.

(21) Appl. No.: 13/055,502

(22) PCT Filed: Jul. 16, 2009

(86) PCT No.: PCT/EP2009/059175
§ 371 (c)(1),
(2), (4) Date: Jan. 24, 2011

(87) PCT Pub. No.: WO2010/010042
PCT Pub. Date: Jan. 28, 2010

(65) Prior Publication Data
US 2011/0120805 A1    May 26, 2011

(30) Foreign Application Priority Data
Jul. 24, 2008  (DE) .................. 10 2008 040 691

(51) Int. Cl.
*F01M 11/06*   (2006.01)
*F16H 57/04*   (2010.01)
*F01M 11/00*   (2006.01)

(52) U.S. Cl.
CPC ........ *F01M 11/064* (2013.01); *F16H 57/0443* (2013.01); *F01M 2011/0041* (2013.01)

(58) Field of Classification Search
CPC ............... F01M 11/064; F01M 2011/0041; F16H 57/0443

(Continued)

(56) References Cited

U.S. PATENT DOCUMENTS 2,805,742 A * 9/1957 Alexandrescu ......... F16D 33/00
                                                   192/103 R
2,938,601 A  5/1960 Brafford
(Continued)

FOREIGN PATENT DOCUMENTS

DE      63 707     10/1968
DE   1 927 174      3/1969
(Continued)

OTHER PUBLICATIONS

Japanese Office Action issued in corresponding Japanese Application No. 2011-517929 mailed Jul. 2, 2013.

*Primary Examiner* — Minh Truong
(74) *Attorney, Agent, or Firm* — Davis & Bujold, PLLC; Michael J. Bujold

(57) ABSTRACT

A transmission oil sump comprises a main oil compartment, in which a suction line of an oil pump is located, and a secondary oil compartment. The secondary oil compartment is in fluid communication with the main oil compartment via an opening. To prevent the introduction of air during rapid acceleration, cornering at high speeds and/or rapid deceleration of the vehicle, a barrier closes the opening to prevent the flow of oil out of the main oil compartment into the secondary oil compartment so that the oil level, required for the oil pump in the main compartment, remains adequately high. When not closed, the opening of the secondary oil compartment is open to ensure oil flow from the secondary oil compartment to the main oil compartment. The secondary oil compartments is arranged so as to collect oil that leaks from transmission components.

6 Claims, 4 Drawing Sheets

(58) Field of Classification Search
USPC .............................. 184/106, 1.5; 123/196 R
See application file for complete search history.

(56) References Cited

U.S. PATENT DOCUMENTS

| | | | | |
|---|---|---|---|---|
| 3,768,613 | A * | 10/1973 | Brunner | 192/113.34 |
| 4,134,380 | A * | 1/1979 | Niwa et al. | 123/142.5 R |
| 4,519,348 | A * | 5/1985 | Hamilton | 123/195 C |
| 5,099,715 | A | 3/1992 | Baiker | |
| 5,895,333 | A | 4/1999 | Morisawa et al. | |
| 6,823,968 | B2 * | 11/2004 | Baeumler | 184/106 |
| 7,124,730 | B2 * | 10/2006 | Schwarzl et al. | 123/196 R |
| 7,193,344 | B2 | 3/2007 | Kabasawa et al. | |
| 7,958,861 | B2 * | 6/2011 | Klumpp et al. | 123/196 R |
| 8,297,407 | B2 * | 10/2012 | Mori et al. | 184/106 |
| 2006/0179973 | A1 * | 8/2006 | Matsufuji et al. | 74/606 R |
| 2006/0207855 | A1 * | 9/2006 | Arnold et al. | 192/70.12 |
| 2007/0169583 | A1 | 7/2007 | Reis et al. | |
| 2008/0023287 | A1 | 1/2008 | Thiede et al. | |
| 2008/0087337 | A1 * | 4/2008 | Grethel | F16D 48/02 137/565.16 |
| 2008/0169030 | A1 | 7/2008 | Schoenek et al. | |
| 2009/0020366 | A1 * | 1/2009 | Mori et al. | 184/106 |
| 2009/0205924 | A1 * | 8/2009 | Agner et al. | 192/87.11 |

FOREIGN PATENT DOCUMENTS

| | | |
|---|---|---|
| DE | 2 115 585 | 10/1972 |
| DE | 7304197 | 5/1973 |
| DE | 35 29 028 C2 | 7/1987 |
| DE | 103 59 109 A1 | 7/2005 |
| DE | 10 2004 043 936 A1 | 3/2006 |
| DE | 10 2004 045 441 A1 | 3/2006 |
| DE | 10 2004 060 595 B3 | 6/2006 |
| DE | 10 2008 003 611 A1 | 9/2008 |
| EP | 1 284 342 A2 | 2/2003 |
| JP | H09109705 | 4/1997 |
| JP | 2002005270 | 1/2002 |
| JP | 2003072390 | 3/2003 |
| JP | 2005-248991 A | 9/2005 |
| KR | 10 2008 000 77 10 A | 1/2008 |

* cited by examiner

GEAR OIL CHAMBER

This application is a National Stage completion of PCT/EP2009/059175 filed Jul. 16, 2009, which claims priority from German patent application serial no. 10 2008 040 691.0 filed Jul. 24, 2008.

FIELD OF THE INVENTION

The present invention relates to a gear oil chamber.

BACKGROUND OF THE INVENTION

In vehicle transmissions the oil level existing in the transmission oil sump varies due to the dynamics of the vehicle, in particular due to speed changes. In extreme driving situations such as an ABS braking process, or when starting off with maximum acceleration or when cornering at high speed, the oil level in the transmission oil sump can vary to an extent which, disadvantageously, results in undesired introduction of air.

From DE 7304197 U an oil sump accessory for blocking through-flow passages by means of a back-flow of oil is known, which comprises a plate with a plurality of openings in which check-flaps are provided, to close the openings. In this way the oil below the accessory is retained and introduction of air by the oil pump in the transmission oil sump is avoided.

With this design situations can arise in which, due to extreme accelerations, the oil collects axially in one part of the transmission oil sump, and this in turn can lead to air introduction.

From JP 2005248991 A, a transmission oil sump is known, in which a baffle plate is provided which defines a main transmission oil compartment and an adjoining transmission oil compartment, and the transmission oil sump has a rotating component arranged in the adjoining transmission oil compartment. In this case the baffle plate is designed in such manner that it enables oil to flow from the adjoining transmission oil compartment into the main transmission oil compartment by virtue of a pumping action produced by the rotating component.

Disadvantageously, the design known from JP 20055248991 A entails higher costs and greater effort for its production and assembly.

From DE 1927174 A, a means for maintaining the oil level in a sump is known, comprising baffles arranged transversely to the driving direction, in which a baffle provided with one or more openings, extends to a height substantially above the oil level when the motor is horizontal, and is in close contact with the bottom and sidewalls up as far as a residual opening that acts as a bypass. In this case the openings can be blocked by a movable flap with a horizontal pivot axis at the top, arranged on the side of the baffle that faces toward the oil inlet grid. With this design oil can disadvantageously flow through the residual opening, particularly during prolonged situations of rapid vehicle deceleration or acceleration, and this too can result in the introduction of air.

SUMMARY OF THE INVENTION

The purpose of the present invention is to provide a transmission oil sump designed in such manner that the oil level relevant for the oil pump in the transmission oil sump remains sufficiently high even during extreme and long-lasting driving situations, such as an ABS braking process, so that the introduction of air can be avoided.

According to these, a transmission oil sump is proposed which comprises a main oil compartment in which the suction line of the oil pump is located, and at least one secondary oil compartment such that the at least one secondary oil compartment is in fluid communication with the main oil compartment, in each case via at least one opening, and means are provided by which the at least one opening is closed in situations of rapid acceleration, cornering at high speed and/or rapid deceleration of the vehicle, in order to prevent oil from flowing out of the main oil compartment into the secondary oil compartment, and such that the secondary oil compartments are arranged so as to receive oil that has leaked from transmission components, for example from the starting clutch. In situations other than rapid acceleration, high-speed cornering and/or rapid deceleration of the vehicle, the openings are open in order to ensure oil exchange and a return flow of leaked oil from at least one secondary oil compartment back into the main oil compartment.

Preferably, the at least one opening is closed in such manner that oil can flow from the secondary oil compartment to the main oil compartment, but not in the opposite direction.

According to the invention, the at least one opening is opened and/or closed by inertial forces, by the force of a spring, and/or by hydrostatic and hydrodynamic pressures of the oil.

To avoid the introduction of air during rapid deceleration of the vehicle, a secondary oil compartment is arranged after the main oil compartment as viewed in the forward driving direction of the vehicle, such that in a particularly advantageous embodiment of the invention the secondary oil compartment is located in the clutch bell. According to the invention, during rapid deceleration of the vehicle the at least one opening is closed due to the inertia and inertial forces of the oil, so that the oil level relevant for the oil pump remains sufficiently high in the transmission oil sump.

In addition or alternatively a further secondary oil compartment can be provided, which is arranged before the main oil compartment as viewed in the forward driving direction of the vehicle, so that during rapid acceleration of the vehicle, for example when starting off, the introduction of air can be avoided.

According to the invention it is also possible to provide two further secondary oil compartments arranged so that during cornering at high speed the at least one opening between one of these secondary oil compartments and the main oil compartment is closed, thereby preventing oil from flowing out of the main oil compartment into the secondary oil compartment owing to the inertia of the oil. Preferably, as viewed in the longitudinal direction of the vehicle these secondary oil compartments are positioned at the level of the main oil compartment, adjacent thereto and on opposite sides of the main oil compartment, and can receive leaked oil from transmission components.

Preferably, the at least one opening of the at least one secondary oil compartment is provided at the end of the housing wall nearest the bottom wall of the transmission oil sump, between the main and the secondary oil compartments, whereby in a simple manner oil can drain into the transmission oil sump via only one oil drainage opening.

By virtue of the concept according to the invention a transmission oil sump is provided in which, in a simple manner and without elaborate control means, sufficient oil for the pump is always available.

In one embodiment of the invention the means for closing the at least one opening between a secondary oil compartment and the main oil compartment consist of a flap valve. In this case the flap valve comprises a hinged flap which opens toward the main oil compartment. Preferably, the hinge arrangement consists of two flexible stamped elements and a cylindrical pin that serves as the pivot axis for the flexible stamped elements. By means for example of screws, the hinge is attached above an opening that can be blocked completely by the flap.

In another embodiment of the invention, the means proposed for closing the at least one opening between a secondary oil compartment and the main oil compartment are in the form of a disk valve, which closes against the force of a spring.

BRIEF DESCRIPTION OF THE DRAWINGS

Below, an example of the invention is explained in more detail with reference to the attached figures, for a situation of rapid deceleration. The function is analogous in cases of cornering at high speed or rapid acceleration. The figures show.

DETAILED DESCRIPTION OF THE PREFERRED EMBODIMENTS

Figure 1:
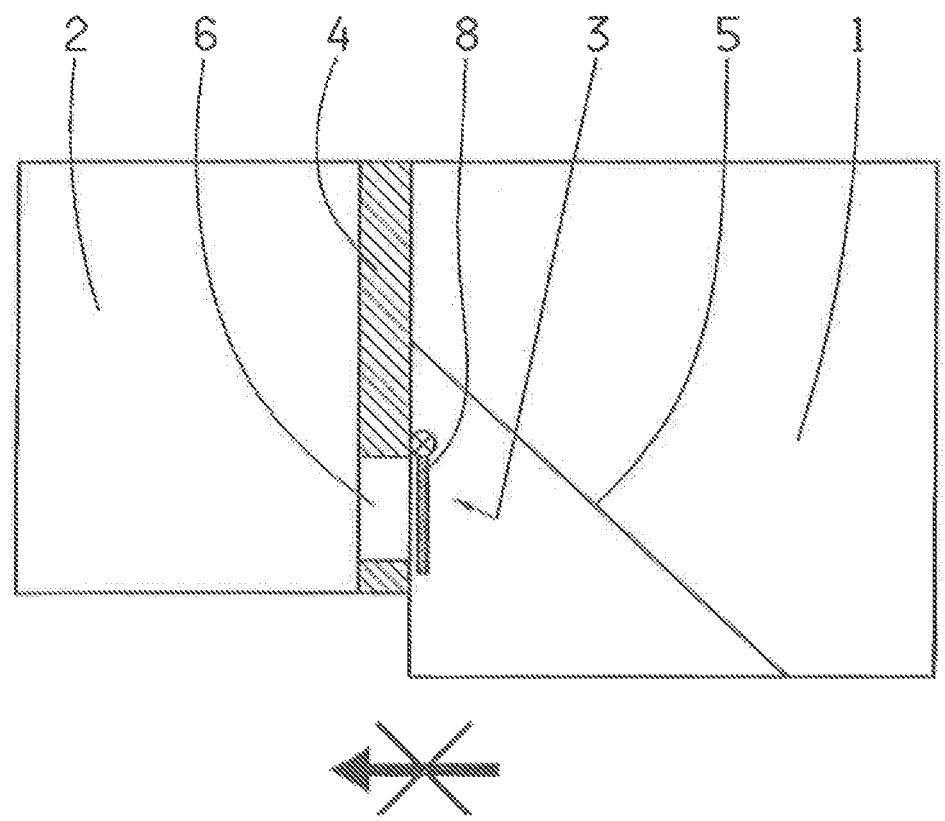
FIG. 1: A diagrammatic view of an embodiment of a transmission oil sump according to the invention, with the opening between the main oil compartment and a secondary oil compartment shown in the closed position.

FIG. 1 shows a transmission oil sump 18 according to the invention, which comprises a main oil compartment 1 in which the suction line 12 of the oil pump is located, and a secondary oil compartment 2 positioned after the main oil compartment as viewed in the forward driving direction of the vehicle. The main oil compartment 1 and the secondary oil compartment 2 are at least partially delimited by bottom and top walls 20, 22 of the transmission oil sump and a housing wall 4. According to the invention the secondary oil compartment is in fluidic communication with transmission oil sump via an opening 6.

In the example shown in FIG. 1 a flap valve 3 is associated with the opening 6, by means of which the opening 6 is closed in situations of rapid deceleration of the vehicle, in order to prevent oil from flowing out of the main oil compartment 1 into the secondary oil compartment 2.

In the event of a rapid deceleration, for example caused by an ABS braking process along an along an acceleration/deceleration axis A (see FIG. 1), the flap 8 of the flap valve 3 is pressed against the housing wall 4 between the main oil compartment 1 and the secondary oil compartment 2 due to the inertia of the flap 8 itself and the dynamic oil pressure produced, so that the opening 6 is blocked as indicated by the arrow at the bottom of the figure. Thus, oil cannot flow from the main oil compartment to the secondary oil compartment 2 closed off by the flap 8, and sufficient oil remains in the transmission sump. In FIG. 1 and the other figures the oil level is indexed 5.

Figure 2:
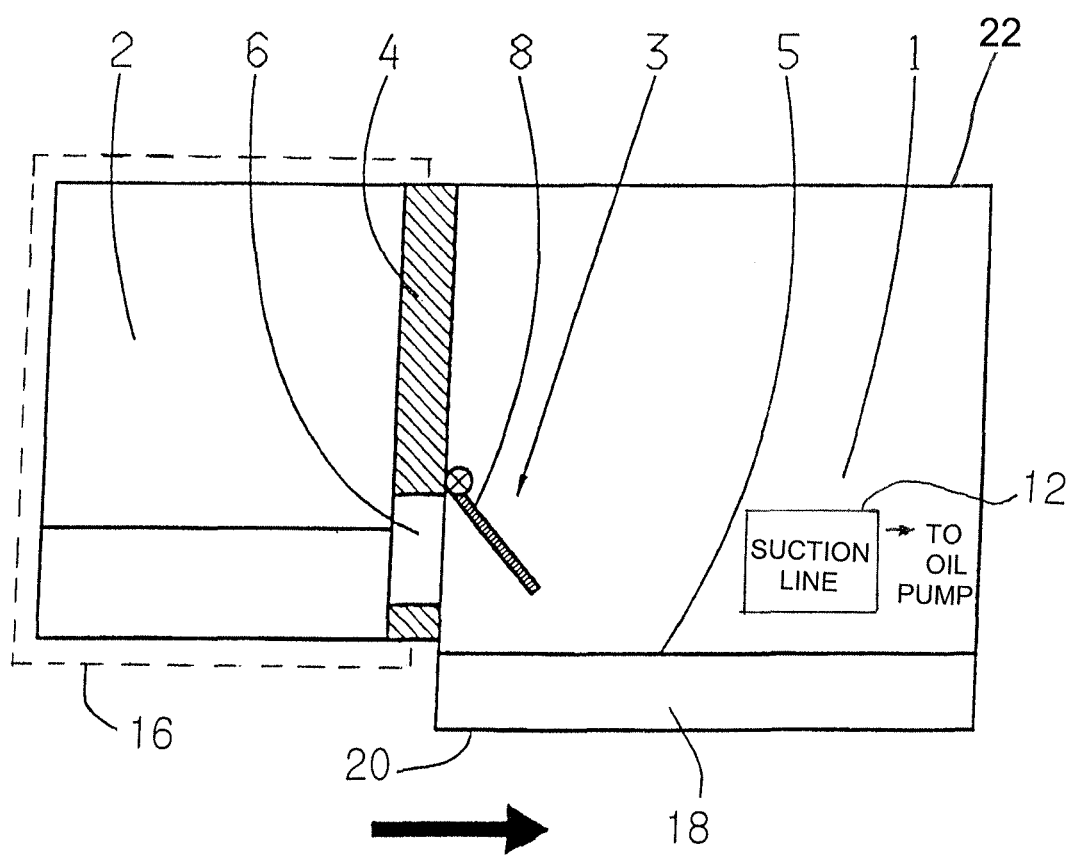
FIG. 2: A diagrammatic view of the embodiment shown in FIG. 1, with the opening between the main oil compartment and a secondary oil compartment in the open position.

When no rapid deceleration is taking place due to brake operation, any leaked oil (for example, this could be oil that has leaked out of the clutch bell 16) that is present in the secondary oil compartment 2 pushes the flap 8 up in the direction into the main oil compartment 1 and this oil can then flow back into the main oil compartment 1 as indicated in FIG. 2.

Figure 3:
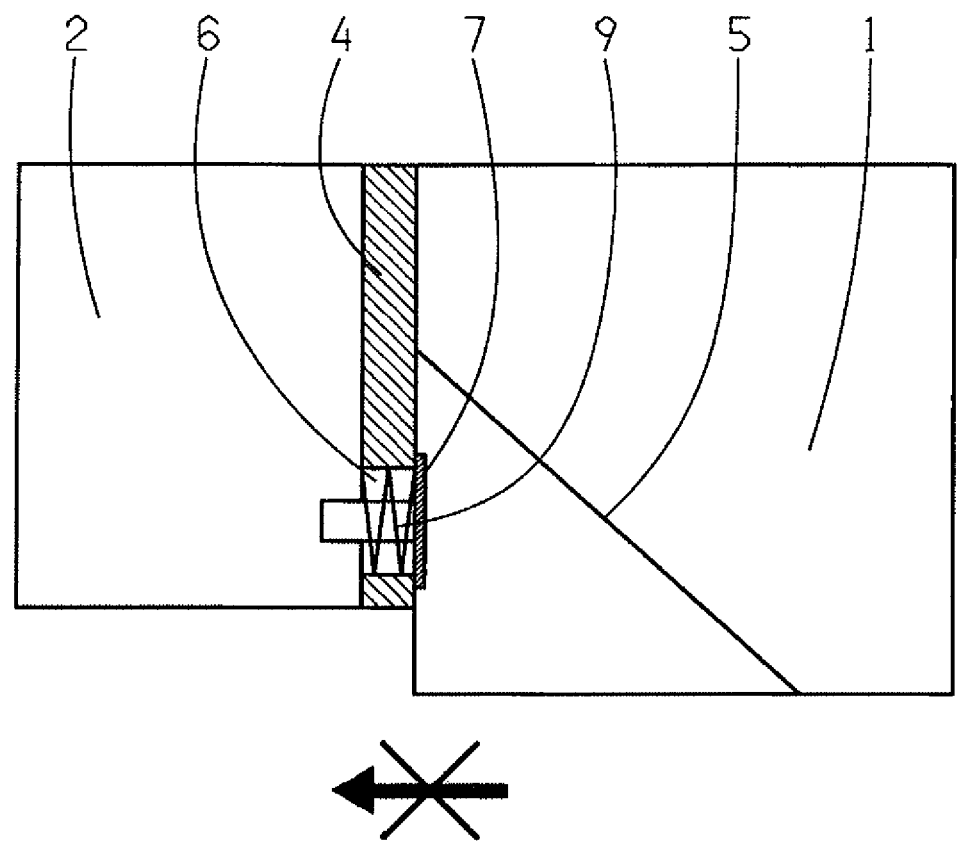
FIG. 3: A diagrammatic view of another embodiment of a transmission oil sump according to the invention, with the opening between the main oil compartment and a secondary oil compartment shown in the closed position.
Figure 4:
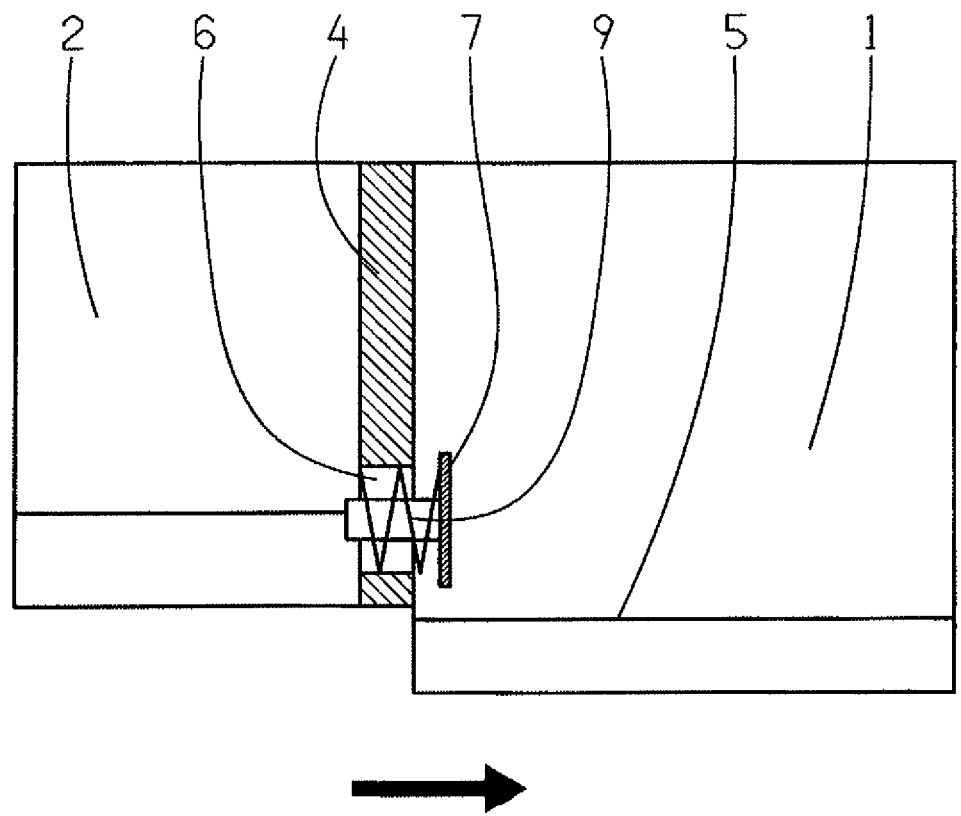
FIG. 4: A diagrammatic view of the embodiment shown in FIG. 3, with the opening between the main oil compartment and a secondary oil compartment in the open position.

The example embodiment shown in FIG. 3 differs from the example embodiment shown in FIG. 1, in that to block the opening 6 a disk valve 7 is provided, which in the event of rapid deceleration is acted upon by the oil in the main oil compartment 1 and so closes the opening 6 against the force of a spring 9.

When no rapid deceleration is taking place due to braking, the disk valve 7 is opened again by virtue of the hydrostatic and dynamic pressure of the leaked oil and the force of the spring 9.

Needless to say, any design particulars and especially any spatial arrangement of the components of the transmission oil sump according to the invention, per se or in relation to one another and provided that they are technically appropriate, fall within the protective scope of the present claims without influencing the function of the transmission oil sump as indicated in the claims, even though such features are not represented explicitly in the figures or in the description.

INDEXES

1 Main oil compartment
2 Secondary oil compartment
3 Flap valve
4 Housing wall
5 Oil level
6 Opening
7 Disk valve
8 Flap
9 Spring

The invention claimed is:

1. A transmission oil sump for a vehicle which prevents air from being sucked into an oil pump, the transmission oil sump comprising:
a main oil compartment (1) in which a suction line to the oil pump is arranged;
a secondary oil compartment (2) being located in a clutch bell and being in fluid communication with the main oil compartment (1) of the transmission oil sump via at least one opening (6) located in a housing wall, and the clutch bell communicating with the secondary oil compartment (2) so as to permit leaked oil from the clutch bell to flow into the secondary oil compartment (2);
the main oil compartment (1) and the secondary oil compartment (2) being axially aligned with one another with respect to a forward driving direction of the vehicle, with the secondary oil compartment (2) being located in front of the main oil compartment (1) with respect to the forward driving direction;
the housing wall being located between the main oil compartment and the secondary oil compartment and the housing wall extending vertically from a top most portion of the oil sump to a bottom wall of the oil sump so as to completely separate the main oil compartment (1) from the secondary compartment so that the secondary compartment is only permitted to communicate with the main compartment when the opening is at least partially open;

a hinged flap (3, 8) comprising a cylindrical pin, being provided by which, during rapid deceleration of the vehicle caused by a braking process, the hinged flap pivots about the pin into a closed position, against the housing wall, in the closed position, the flap lying in a plane extending normal to the forward driving direction of the vehicle and blocking the at least one opening (6) to prevent oil from flowing out of the main oil compartment (1) into the secondary oil compartment (2) such that oil only flows from the secondary oil compartment (2) into the main oil compartment (1) and an oil level in the main oil compartment (1), for the oil pump, is maintained at a sufficiently high level so as to prevent introduction of air into the oil pump via the suction line that is connected between the main oil compartment and the oil pump, but in a situation without any rapid deceleration of the vehicle occurring, leaked oil which accumulates in the secondary oil compartment (2) pivots the hinged flap, about the pin, away from the housing wall and into the main oil compartment (1) so that the hinged flap is pivoted into an at least partially open position which facilitates the flow of leaked oil through the at least one opening (6) of the secondary oil compartment (2) into the main oil compartment;

during operation of the oil pump, other than during rapid deceleration, the oil which leaks from the clutch bell into the secondary oil compartment and accumulates in the secondary, oil compartment (2) can flow from the secondary oil compartment (2) through the at least one opening (6), and then flow into the main oil compartment so as to maintain the sufficiently high oil level in the main oil compartment thereby preventing the introduction of air into the oil pump via the suction line during rapid deceleration of the vehicle; and a bottom surface of the main oil compartment (1) is located sufficiently vertically below a bottom surface of the secondary oil compartment (2) so that the oil level contained within the main oil compartment (1) is normally located vertically below the bottom surface of the secondary oil compartment (2) to facilitate the flow of the oil from the secondary oil compartment (2) through the at least one opening (6) into the main oil compartment (1) when the at least one opening (6) is at least partially open.

2. The transmission oil sump for a vehicle according to claim 1, wherein the at least one opening (6) of the secondary oil compartment (2) is closable by the hinged flap such that oil flows in only one direction from the secondary oil compartment (2) into the main oil compartment (1), and is prevented from flowing in an opposite direction.

3. The transmission oil sump for a vehicle according to claim 1, wherein the at least one opening (6) of the secondary oil compartment (2) is at least one of opened and closed by displacement of the hinged flap, the hinged flap is displaceable by at least one of inertia, a force of a spring, and hydrostatic and hydrodynamic dynamic pressure of the oil.

4. The transmission oil sump for a vehicle according to claim 1, wherein the hinged flap is designed as a hinged flap valve (3) such that the hinged flap (8) of the flap valve (3) is opened toward the main oil compartment (1) and, in the situations when rapid deceleration of the vehicle is occurring, the flap is forced against the housing wall (4), located between the main oil compartment and the secondary oil compartment (2), by virtue of an inertia of the flap (8) and dynamic oil pressure produced in the main oil compartment (1) such that the opening (6) is blocked, whereas in situations other than during rapid deceleration of the vehicle, by virtue of hydrostatic pressure, any leaked oil present in the secondary oil compartment forces the flap (8) toward the main oil compartment (1) to permit flow.

5. The transmission oil sump for a vehicle according to claim 4, wherein the at least one opening (6) of the secondary oil compartment (2) is formed at an end of the housing wall (4), between the main oil compartment (1) and the secondary oil compartment (2), which is adjacent to the bottom wall of the transmission oil sump.

6. A transmission oil sump for a vehicle, the transmission oil sump comprising:

a main oil compartment in which a suction line to an oil pump is arranged;

a secondary oil compartment being located in a clutch bell and the secondary oil compartment being in fluid communication with the main oil compartment of the transmission oil sump via an opening located in a housing wall such that leaked oil to flows from transmission components in the clutch bell into the secondary oil compartment;

the main oil compartment and the secondary oil compartment being axially aligned with one another along a forward driving direction of the vehicle, with substantially all of a bottom surface of the secondary oil compartment (2) being in front of a bottom surface of the main oil compartment (1) with respect to the forward driving direction;

the housing wall being located between the main oil compartment and the secondary oil compartment and the housing wall extending vertically from a top most portion of the oil sump to a bottom wall of the oil sump and completely separating the main and the secondary compartments from one another so that the secondary compartment is only permitted to communicate with the main compartment via the opening;

a hinged flap comprising a cylindrical pin, the pin defining a pivot axis extending normal to the forward driving direction of the vehicle, the flap being provided for opening and closing the opening so that, during rapid deceleration of the vehicle incorporating the transmission, the hinged flap pivots about the pin and toward the housing wall into a closed position for blocking the opening to prevent oil from flowing out of the main oil compartment into the secondary oil compartment and thereby maintaining an oil level in the main oil compartment, for the oil pump, at a sufficiently level so as to prevent introduction of air into the oil pump via the suction line, but in situations without any rapid deceleration of the vehicle occurring, leaked oil which accumulates in the secondary oil compartment pivots the hinged flap, about the pin, away from the housing wall and into the main oil compartment so that the hinged flap is pivoted into at least a partially open position which facilitates the flow of leaked oil through the opening and into the main oil compartment;

during operation of the oil pump, the secondary oil compartment receiving oil which leaks from the clutch bell and, other than during rapid deceleration, the oil leaked from the clutch bell can flow into the secondary oil compartment into the main oil compartment; and the bottom surface of the main oil compartment is located sufficiently vertically below the bottom surface of the secondary oil compartment so that the oil level contained within the main oil compartment is normally located vertically below the bottom surface of the secondary oil compartment to facilitate the flow of the oil from the secondary oil compartment into the main oil compartment when the opening is at least partially open.

* * * * *